A. H. WOUTERS.
DYNAMO ELECTRIC MACHINE.
APPLICATION FILED JAN. 31, 1907.

917,510.

Patented Apr. 6, 1909.
2 SHEETS—SHEET 1.

Witnesses
Inventor
Alfred H. Wouters
By
Chas. E. Lord
Attorney

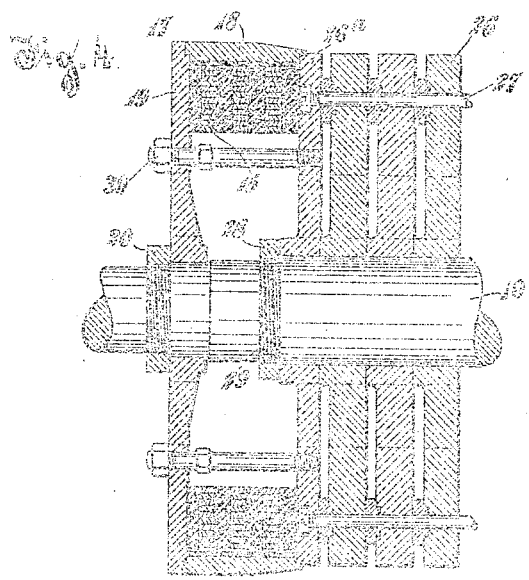
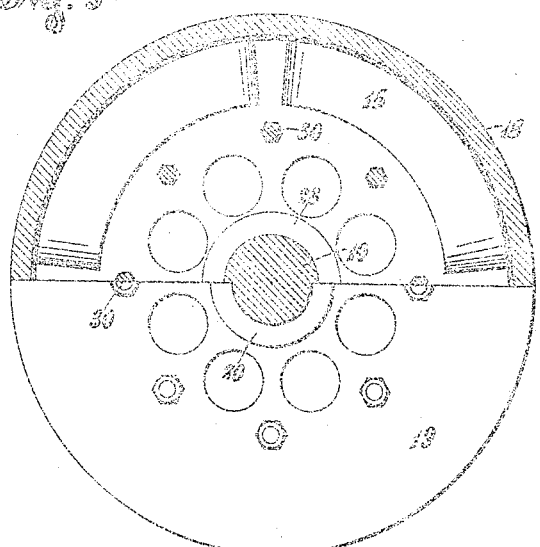

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 917,510.      Specification of Letters Patent.      Patented April 6, 1909.

Application filed January 31, 1907. Serial No. 355,039.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Dynamo-Electric Machines, of which the following is a full, clear, and exact specification.

My invention relates to rotary members of high speed dynamo-electric machines, particularly to rotary field members of turbo-alternators of the cylindrical core type. Rotary field members of this type are usually provided with radial slots and with wedge-shaped field coils arranged concentrically about each pole and having end portions which project beyond the core. The projecting portions of the coils are inclosed within and are supported by end covers or shields each of which consists of a ring or cylindrical portion which surrounds the coils and with an end portion either integral with the cylindrical portion or separate therefrom, at right angles to the shaft and cylindrical portion. Each end cover usually rests upon the core and the shaft and is held in position by a nut on the latter.

One of the objects of my invention is to provide means whereby the parts of the rotary member, particularly the parts at the ends thereof, such as the end covers and the ends of the coils, are held more firmly in position and prevented from moving relative to each other during rotation.

With this end in view, my invention consists in certain novel details of construction and combinations and arrangements of parts which will be described in the specification and pointed out in the appended claims.

For a better understanding of my invention, reference is had to the accompanying drawings in which—

Figure 1:
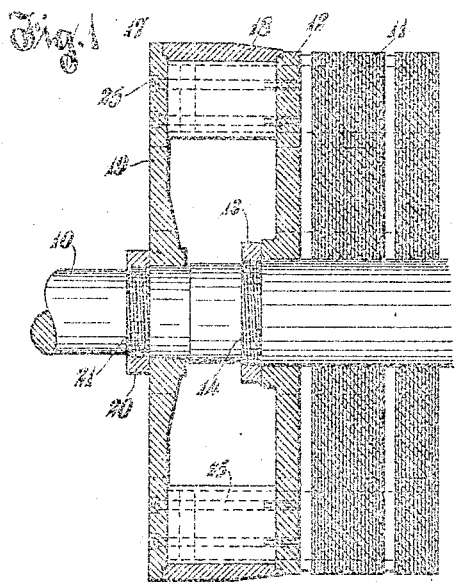
Figure 2:
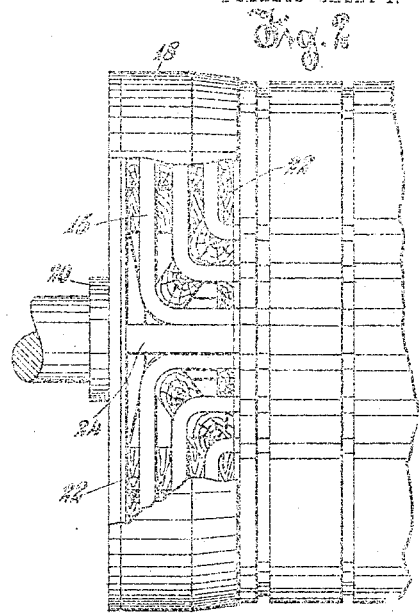
Figure 3:
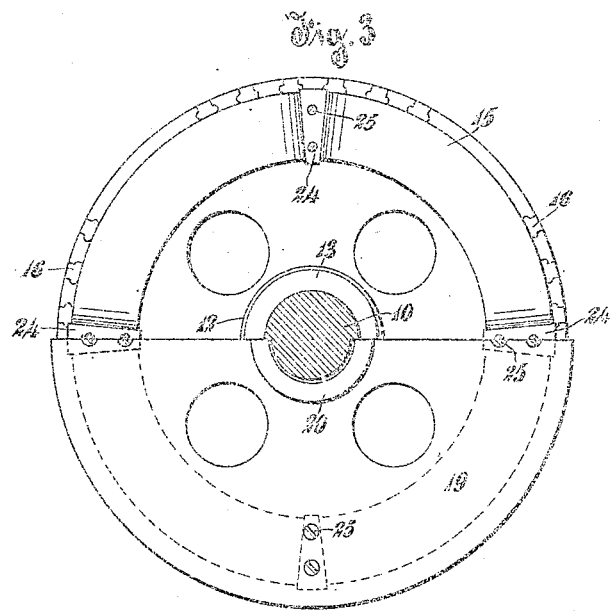

Figure 1 is a partial longitudinal sectional view of a rotary field member of a turbo-alternator equipped with my invention. Fig. 2 is a partial plan view of the same, parts being broken away for the sake of clearness. Fig. 3 is an end view, partly in elevation and partly in section. Fig. 4 is a partial longitudinal sectional view showing a modified form of my invention, and Fig. 5 is an end view of the same, parts being removed for the sake of clearness.

Referring now to Figs. 1, 2 and 3 of the drawings, 10 represents a shaft of the machine on which is mounted the core 11, which as here shown is composed of laminæ clamped between the end plates, one of which is shown at 12. End-plate 12 is held in position by a nut 13 engaging the threaded portion 14 of the shaft. The core is provided with radial slots in which are located wedge-shaped field coils 15 of edgewise-wound strap copper, being held in position by wedges 16 of non-magnetic material. The end portions of the coils, as shown, extend beyond the end of the core, and are inclosed within an end cover or shield 17 consisting in this instance, of two parts, a ring, band or cylindrical portion 18, and an annular disk 19 mounted on the shaft at right angles to the latter and to the ring. The ring 18 is supported by the end plate 12 and the disk 19, the inner edge of the ring resting within a groove in the end plate, and the outer edge resting within a groove in the end disk 19. At 20 is a nut which engages the threaded portion 21 of the shaft to hold the end cover and its parts in place. The ends of the coils bear against the inner surfaces of the end ring 18 and are thus prevented from being bent outward by centrifugal force. The coils of each group are separated from one another, from the core and from the end disk by insulating spacing members 22. Located between the ends of adjacent groups of coils are filling blocks or wedge-shaped members 24 which extend from the core or end plate 12 to the end disk 19, and bear against the end cover 18. These filling blocks which are preferably made from some light material such as aluminum, are substantial continuations of the core teeth which lie between the groups of coils. This construction is shown most clearly in Figs. 2 and 3. At 25 are shown axial bolts or studs which extend through the end disk 19 and wedge-shaped filling blocks 24 into tapped holes in the end plate 12 of the core. In this instance I have shown eight such bolts at the end of the machine, two bolts passing through each filling block. The ends of the bolts are preferably located in counter-sunk holes in the end disk 19. The purpose or functions of the filling blocks 24 and axial bolts 19 will now be explained. Heretofore the end covers and the parts composing them have been held in position by nuts 20. By means of the bolts 25 the end disk 19 and end ring 18 are drawn more closely together and the end cover as a whole is held more firmly against the end plate 12 of the core. By thus tightly drawing in position the parts of the end cover, the coils are also pressed more firmly in the direction of the axis of the shaft. By means of the wedge-shaped filling blocks 24 a shifting of the coils circumferentially is absolutely prevented. The bolts 25 hold the filling blocks 24 firmly in position and prevent their shifting circumferentially. Not only do the filling blocks support the coils but they have another function equally as important, namely they support the portions of the bolts 25 between the end plate 12 and end disk 19, so as to prevent said bolts being sheared or bent outward by centrifugal force.

In Figs. 4 and 5 I have shown modifications of my invention which show more clearly the function of the bolts independent of the filling blocks. The core in this case is composed of a number of solid steel disks 26 mounted on the shaft and drawn tightly together by axial bolts 27 and end nuts, one of which is shown at 28 engaging the threaded portion 29 of the shaft. The rotor here shown is provided with coils 15 and end cover 17 consisting of a ring 18 and end disk 19 similar to that first described. Extending between the end disk 19 and the outer disk 26ª of the core within the projecting portions of the coils are a large number of bolts 30. The portions of the bolts between the disk 26ª of the core and the disk 19 of the end cover are unsupported and are made accordingly stronger than those shown in Figs. 1 and 3, being larger and preferably made of strong material such as nickel steel. By means of these bolts 30 the end cover and its parts and the coils are held firmly in position, as in the construction first described.

I aim in my claims to cover all modifications which do not involve a departure from the spirit and scope of my invention.

What I claim as new and desire to secure by Letters Patent is:—

1. In a high speed rotor, a core having radial slots, groups of concentric coils located in the slots and having end portions projecting beyond the core, wedge shaped insulating bracing blocks located intermediate the groups of coils and extending outward from the core as substantial continuations of the teeth thereof, and end shields or covers for the end portions of the coils, each cover comprising a cylindrical portion surrounding said portions of the coils and an inwardly extending end portion, said bracing blocks engaging both the cylindrical portions and the inwardly extending end portions of the end covers so that the latter prevent displacement of said blocks both radially and axially.

2. In a high speed rotor, a core, groups of concentric coils carried thereby and projecting beyond the ends thereof, end covers for the projecting portions of the coils, filling blocks between the groups of coils, each extending between the core and end-cover and axial bolts extending between the end-cover and core through the filling blocks.

3. In a high-speed rotor of a dynamo-electric machine, a core having radial slots, groups of concentric coils located in the slots and having end portions projecting beyond the ends of the core, insulating spacing members separating the end portions of the coils of each group from one another and from the core, wedge shaped bracing blocks between the end portions of the groups of coils, said bracing blocks extending outward from the core as substantial continuations of the teeth thereof, end covers for the projecting portions of the coils comprising a cylindrical portion and an end portion extending inward, and means for securing the end covers and bracing blocks in position comprising bolts extending axially through the end portions of the covers, through the bracing blocks, and into the core.

4. In a high speed rotor of a dynamo-electric machine, a core having radial slots, groups of concentric coils located in the slots and having parallel end portions located beyond the ends of the core, insulating spacing blocks separating the parallel end portions of the coils of each group from one another and from the core, insulating wedge shaped bracing blocks intermediate the groups of coils and extending outward from the core as substantial continuations of the teeth thereof, end covers surrounding the end portions of the coils, each end cover comprising a cylindrical portion and an end portion extending inward, and means for securing the end cover and the wedge shaped bracing blocks in position comprising axial bolts passing through the end portions of the end covers, through the bracing blocks, and into the core.

5. In a rotor of a dynamo-electric machine, a slotted cylindrical core, groups of concentric coils located in the slots of the core and projecting beyond the ends thereof, wedge-shaped filling blocks between the ends of the groups of coils, end-covers for the projecting portions of the coils each including a ring or band against which the coils and filling blocks bear, and an annular disk or plate mounted on the shaft and engaging the ring or band, and one or more bolts passing through the annular disk or plate and filling blocks into the core.

6. In a rotor of a dynamo-electric machine, a slotted core, groups of concentric coils located in the slots and projecting beyond the ends of the core, end covers inclosing the portions of the coils which project beyond the core, each end cover comprising a cylindrical portion surrounding the coils and a portion extending inwardly toward the shaft, wedge-shaped bracing members of non-magnetic material located between the adjacent groups of coils and bearing against the core and the outer cylindrical portions and the inwardly extending portions of the end covers, and axial bolts extending through the end covers and coil bracing members into the core, whereby the bolts hold the end covers and coil bracing members in place and the latter prevent the shearing of the bolts.

In testimony whereof I affix my signature in the presence of two witnesses.

ALFRED H. WOUTERS.

Witnesses:
ARTHUR F. KWIS,
FRED J. KINSEY.